A. E. WEST.
AMUSEMENT APPARATUS.
APPLICATION FILED JAN. 19, 1911.
1,000,219.
Patented Aug. 8, 1911.
2 SHEETS—SHEET 1.
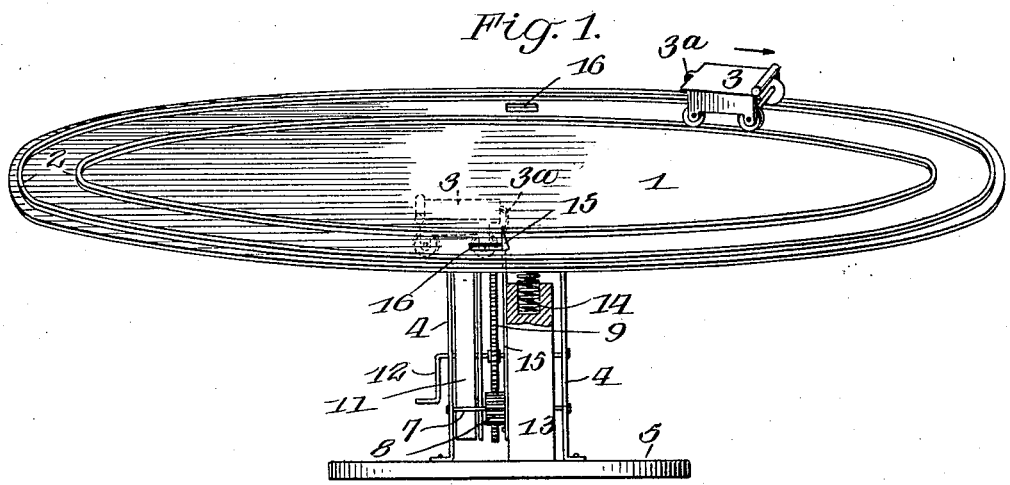
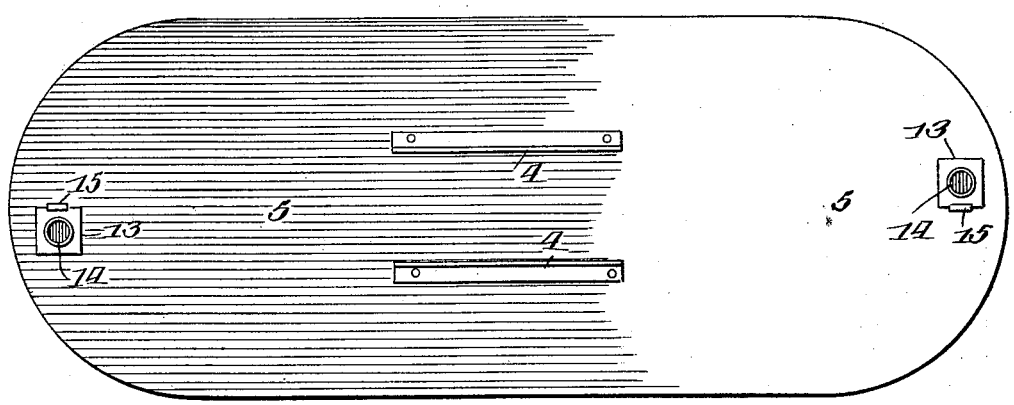
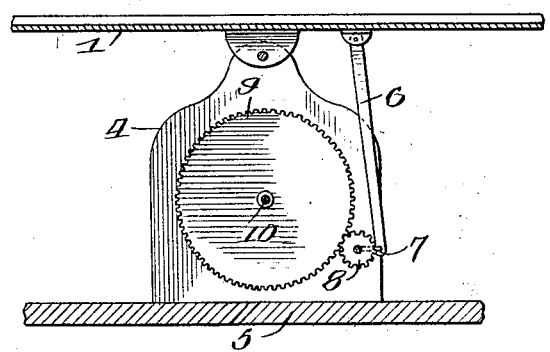
WITNESSES:
Samuel E. Wade
Amos H. Hart
INVENTOR
ALONZO E. WEST
BY Munn & Co.
ATTORNEYS

A. E. WEST.
AMUSEMENT APPARATUS.
APPLICATION FILED JAN. 19, 1911.

1,000,219.

Patented Aug. 8, 1911.
2 SHEETS—SHEET 2.

WITNESSES:
Samuel E. Wade
Amos W. Hart

INVENTOR
ALONZO E. WEST
BY
ATTORNEYS

COLUMBIA PLANOGRAPH CO., WASHINGTON, D. C.

UNITED STATES PATENT OFFICE.

ALONZO E. WEST, OF PORTSMOUTH, OHIO.

AMUSEMENT APPARATUS.

1,000,219.  Specification of Letters Patent.  Patented Aug. 8, 1911.

Application filed January 19, 1911. Serial No. 603,538.

*To all whom it may concern:*

Be it known that I, ALONZO E. WEST, a citizen of the United States, and a resident of Portsmouth, in the county of Scioto and State of Ohio, have invented certain Improvements in Amusement Apparatus, of which the following is a specification.

My invention is embodied primarily in a pivoted circular platform adapted to oscillate vertically, and whereon a car or truck is adapted to travel, the required impetus being derived from the motion of the platform, which is produced by hand power, a spring, or any other form of motive agent.

A special feature of the apparatus is the provision of means for automatically engaging and momentarily locking the platform at opposite sides, alternately, the lock being applied at the lower side or edge of the platform and continuing long enough to insure the descent of the car to and past that point, when it automatically releases the lock, the car then passing to the opposite side of the platform and the same operation being there repeated.

The details of construction, arrangement, and operation of parts are as hereinafter described, and illustrated in the accompanying drawings, in which—

Figure 4:
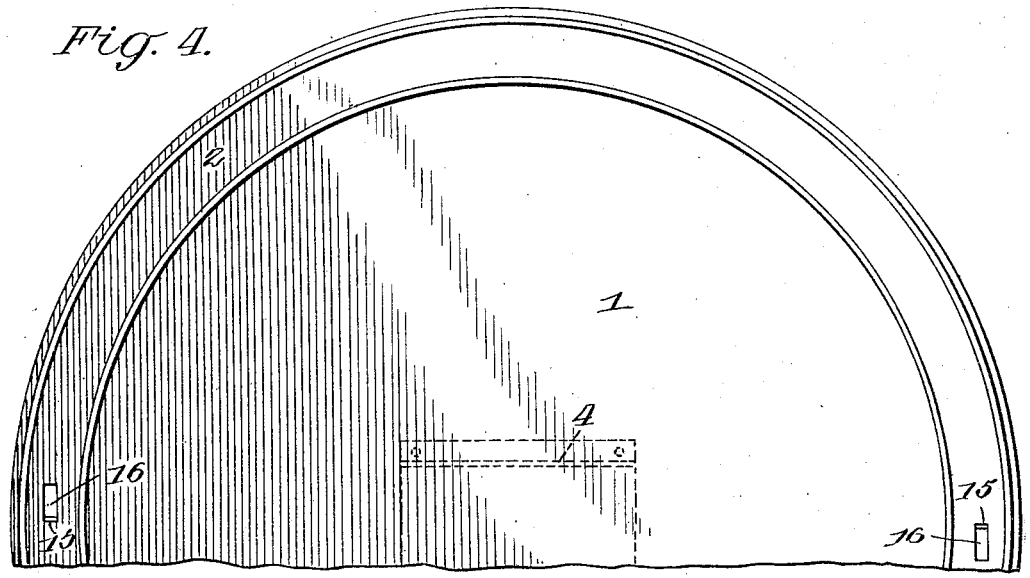
Figure 5:
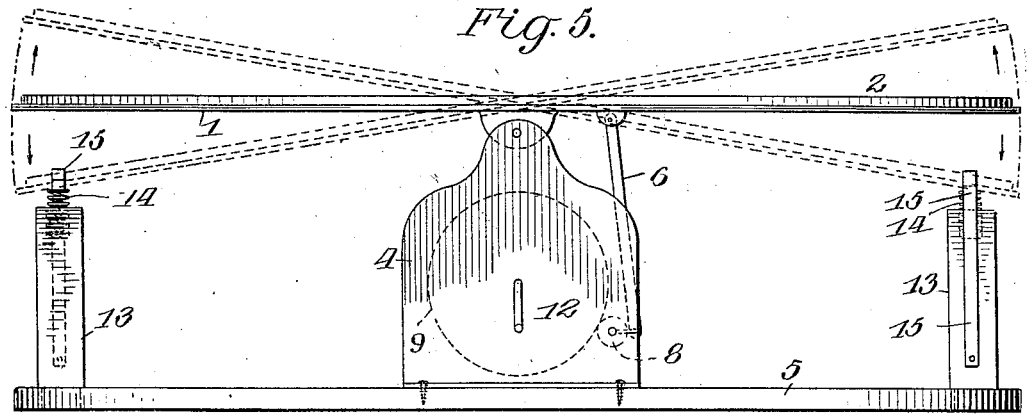
Figure 6:
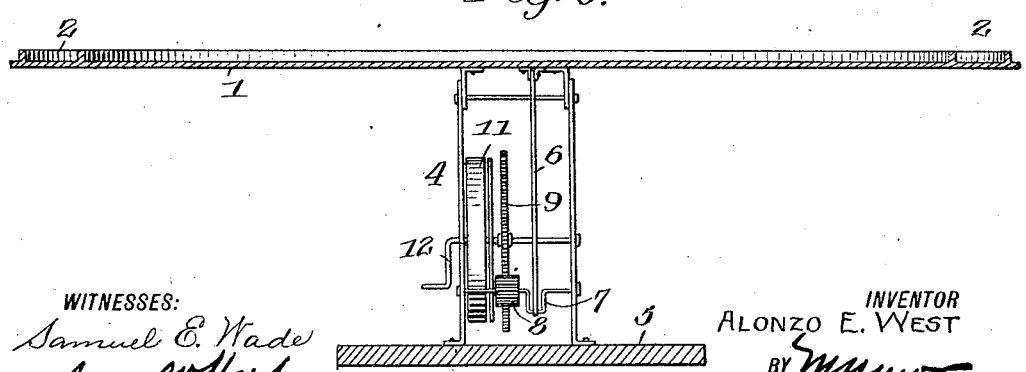

Figure 1 is mainly a perspective view of the apparatus. Fig. 2 is a plan view of the base. Fig. 3 is a vertical section. Fig. 4 is a plan view of the major portion of the platform. Fig. 5 is a side view of the apparatus. Fig. 6 is a vertical section taken at right angles to the one illustrated in Fig. 3.

The circular platform 1 is provided adjacent to its edge with a track 2 upon which a wheeled truck or car 3 is adapted to run. The platform is pivoted centrally at the top of two parallel, vertical posts 4 which are secured to an oval base 5—see Fig. 2. The platform is thus adapted to oscillate in a vertical plane, as indicated by dotted lines in Fig. 5. The oscillation may be effected by hand power, spring power, or in any other suitable manner. As illustrated in several figures, a link or pitman 6 is connected with the platform at a short distance from its pivot and the lower end is journaled on a transverse crank-shaft 7 upon which is keyed a spur pinion 8 that meshes with a large gear 9 mounted and keyed upon a transverse shaft 10 to which a coil spring 11 is applied. These parts are all arranged in and between the two vertical standards 4. A crank 12 is employed for winding the spring, or it may be applied without the spring, for rotating the gear 9 and thus transmitting rotation to the crankshaft 7 and thereby oscillating the platform.

On the ends of the oval base 5 there are posts 13 which are recessed at the top to receive spiral springs 14 that serve as spring bumpers for the platform which comes in contact therewith, alternately, at opposite sides, at each complete oscillation.

In order to lock and hold the platform momentarily at each side as it descends, so that time may be allowed for the car or truck 3 to descend to and pass that point, I provide a spring catch 15, which is attached to the side of a post 13 and projects upward far enough to pass through a slot 16 formed in the edge of the platform between the rails of the track 2. In Fig. 1, the platform is shown depressed at one side and engaged with, and locked by, the catch 15, the shouldered head of the latter being projected through a slot 16 and engaging or overlapping the platform at one end of the slot.

The direction of movement of the car is indicated by arrow (Fig. 1), and, as it descends, the inclined platform toward the catch 15, it trips the latter and thus releases the platform on that side, which then rises so that the car or truck moves down the other side of the platform opposite that which it had just descended. The release of the catch is effected automatically by the car or truck itself, which is provided at the rear with a pendent prong 3ª adapted to strike the head of the spring catch 15, the impetus or momentum of the car being sufficient to carry the head of the catch laterally far enough to free it from the shoulder of the slot 16. Thus, the platform is oscillated and momentarily locked or arrested at each half oscillation at each side as it descends, and is automatically released by the car as it passes the catch. The springs 14 serve as buffers when the platform descends, alternately, at opposite sides, and also as means for forcing the depressed side of the platform upward again when released.

The platform 1 may be constructed of various materials, as wood or metal, but I prefer to form it from a sheet of galvanized iron, and the tracks may be struck up therefrom or formed separately and secured thereto. If the platform be made of cast metal, the tracks, of course, may be cast integrally with it.

It is obvious that, in place of providing two rails on the platform, a single one may be used adjacent to the edge and the car might be suspended therefrom by means of a hanger and pulley so as to swing below the edge of the platform.

While my invention is intended primarily as a toy amusement apparatus, it may be constructed on a larger scale and thus adapt it for conveying passengers.

What I claim is:—

1. The improved amusement apparatus, comprising a base, a support erected thereon, a platform pivoted to such support, means for oscillating the platform, means for temporarily and automatically locking the platform at each side during each oscillation, and a car adapted to travel on the platform and to automatically engage and release the locking means, substantially as described.

2. An amusement apparatus, comprising a suitable base and vertical support erected thereon, a platform pivoted to such support, a spring catch arranged at opposite ends of the base and adapted to automatically engage and lock the platform at each side during each oscillation, and a car adapted to travel on the track and to engage and automatically release the catch, substantially as described.

3. The amusement device, comprising a platform provided with a track and slots at opposite points adjacent to the edge, a base support to which the platform is pivoted and on which it is adapted to oscillate vertically, a spring catch adapted to project through one of the slots of the platform when the adjacent edge of the same is depressed and to engage and lock with the platform automatically, and a traveler on the platform which automatically engages and releases the catch, substantially as described.

4. In an amusement device of the type indicated, the combination with an oscillating platform and a support upon which it is pivoted, of a spring bumper arranged at opposite points and adapted for engagement with the platform at opposite points as it oscillates, substantially as described.

5. In an amusement apparatus of the type indicated, the combination with an oscillating platform and a support upon which it is pivoted, of a post and a spring supported thereon and adapted to engage the platform alternately at opposite points as it descends, a spring catch adapted to engage the platform at the same time, and means for automatically releasing the catch, whereupon the spring aids the platform in continuing its oscillation, substantially as described.

ALONZO E. WEST.

Witnesses:
W. A. WURSTER,
S. S. HALDERMAN.

---

Copies of this patent may be obtained for five cents each, by addressing the "Commissioner of Patents, Washington, D. C."